United States Patent
Hashimoto

(10) Patent No.: US 10,704,459 B2
(45) Date of Patent: Jul. 7, 2020

(54) TURBOCHARGER

(71) Applicant: IHI Corporation, Koto-ku (JP)

(72) Inventor: Koji Hashimoto, Tokyo (JP)

(73) Assignee: IHI Corporation, Koto-ku (JP)

( * ) Notice: Subject to any disclaimer, the term of this patent is extended or adjusted under 35 U.S.C. 154(b) by 213 days.

(21) Appl. No.: 15/451,863

(22) Filed: Mar. 7, 2017

(65) Prior Publication Data

US 2017/0175618 A1   Jun. 22, 2017

Related U.S. Application Data

(63) Continuation of application No. PCT/JP2015/081753, filed on Nov. 11, 2015.

(30) Foreign Application Priority Data

Jan. 29, 2015   (JP) .................................. 2015-015034

(51) Int. Cl.
*F02B 37/16*   (2006.01)
*F04D 25/02*   (2006.01)
*F04D 27/02*   (2006.01)

(52) U.S. Cl.
CPC ............ *F02B 37/16* (2013.01); *F04D 25/024* (2013.01); *F04D 27/0215* (2013.01); *Y02T 10/144* (2013.01)

(58) Field of Classification Search
CPC .......... F02B 37/16; F02B 39/12; F02B 39/00; F04D 25/024; F04D 27/0215

(Continued)

(56) References Cited

U.S. PATENT DOCUMENTS 4,373,337 A  *  2/1983  Widmann ............... F02B 37/16
                                                          60/611
4,817,387 A  *  4/1989  Lashbrook .............. F02B 37/16
                                                          60/600

(Continued)

FOREIGN PATENT DOCUMENTS

JP        56-167813 A     12/1981
JP        60-23219 U      2/1985

(Continued)

OTHER PUBLICATIONS

Office Action dated Dec. 12, 2017 in Japanese Patent Application No. 2016-571777.

(Continued)

*Primary Examiner* — Ngoc T Nguyen
(74) *Attorney, Agent, or Firm* — Oblon, McClelland, Maier & Neustadt, L.L.P.

(57) ABSTRACT

A turbocharger includes a backflow passage that returns a part of gas flowing through a compressor wheel to a suction passage. The turbocharger includes an exhaust opening formed in a wall portion of an exhaust passage inside a compressor housing and that opens the exhaust passage to the outside of the compressor housing, a suction opening formed in a wall portion of the suction passage inside the compressor housing and that opens the suction passage to the outside of the compressor housing, and a backflow pipe of which one end is connected to the exhaust opening and the other end is connected to the suction opening and has the backflow passage inside thereof. In a state where the backflow pipe is removed from the exhaust opening and the suction opening, the suction opening is formed at a position at which the suction opening is visible when seen from a position opposite to the exhaust opening.

10 Claims, 3 Drawing Sheets

(58) Field of Classification Search
USPC .................................................. 60/611, 605.1
See application file for complete search history.

(56) References Cited

U.S. PATENT DOCUMENTS

| | | | |
|---|---|---|---|
| 5,137,003 A | 8/1992 | Kyoya et al. | |
| 2009/0031722 A1 | 2/2009 | An et al. | |
| 2014/0140814 A1 | 5/2014 | Isono et al. | |
| 2015/0125265 A1 | 5/2015 | Krewinkel et al. | |
| 2017/0292441 A1* | 10/2017 | Jin | ...................... F04D 29/4213 |
| 2017/0328270 A1* | 11/2017 | Chu | ........................ F02B 37/16 |

FOREIGN PATENT DOCUMENTS

| | | |
|---|---|---|
| JP | 2-63036 U | 5/1990 |
| JP | 2-305323 | 12/1990 |
| JP | 3-5934 U | 1/1991 |
| JP | 4-11222 U | 1/1992 |
| JP | 11-182257 | 7/1999 |
| JP | 2005-61337 A | 3/2005 |
| JP | 2005-61342 | 3/2005 |
| JP | 2006-336539 | 12/2006 |
| JP | 2007-247518 A | 9/2007 |
| JP | 2009-281229 A | 12/2009 |
| JP | 4495120 | 6/2010 |
| JP | 2012-241560 | 12/2012 |
| JP | 2014-101827 | 6/2014 |
| WO | WO 2013/180960 A2 | 12/2013 |
| WO | WO-2017160200 A1 * | 9/2017 ............. F02B 37/12 |

OTHER PUBLICATIONS

International Search Report dated Jan. 19, 2016 in PCT/JP2015/081753 filed on Nov. 11, 2015 (with English translation).
Written Opinion dated Jan. 19, 2016 in PCT/JP2015/081753 filed on Nov. 11, 2015.
Office Action dated Apr. 24, 2018 in Japanese Patent Application No. 2016-571777.

* cited by examiner

TURBOCHARGER

CROSS REFERENCE TO RELATED APPLICATIONS

This application is a continuation application of International Application No. PCT/JP2015/081753, filed on Nov. 11, 2015, which claims priority to Japanese Patent Application No. 2015-015034, filed on Jan. 29, 2015, the entire contents of which are incorporated by reference herein.

BACKGROUND

1. Technical Field

The present disclosure relates to a turbocharger provided with a backflow passage that returns a part of gas after compression to an upstream side of a compressor wheel.

2. Description of the Related Art

Typical turbochargers include a bearing housing that rotatably holds a shaft. A turbine wheel is fitted to one end of the shaft, and a compressor wheel is fitted to the other end of the shaft. The turbocharger is coupled to an engine, and the exhaust gas discharged from the engine is caused to flow into the turbocharger. When the turbine wheel is rotated by the action of the exhaust gas, the rotation of the turbine wheel causes the compressor wheel to rotate via the shaft, and the air flown on the compressor wheel is compressed and discharged outside.

JP 2006-336539 A proposes that such a turbocharger is provided with a bypass hose that allows communication between an inlet pipe that guides gas (such as air) to the turbocharger and an outlet pipe that guides compressed air from the turbocharger to the engine. In this configuration, when a turbo pressure increases, surge can be suppressed by returning a part of the compressed air to the upstream of the turbocharger. However, arrangement of the pipes and the hose becomes complicated, making the design difficult. This results in lowered assembly workability. To address this problem, recently it has become common to arrange a bypass passage (backflow passage) inside the turbocharger body to return the compressed air to an upstream side of the compressor wheel.

SUMMARY

If a backflow passage is to be formed inside a turbocharger body, it is necessary that the backflow passage is formed within a thickness range of walls of a housing. This limitation lowers the degree of freedom to design the shape of the backflow passage, and depending on the operating conditions, the flow noise generated when the compressed air is returned to the upstream side of the compressor wheel may become noticeable.

An object of the present disclosure is to provide a turbocharger capable of suppressing the generation of flow noise caused by the compressed air when the compressed air is returned to the upstream side of the compressor wheel while reducing the complication of the design work.

An aspect of the present disclosure is a turbocharger including: a housing configured to accommodate a compressor wheel and includes a suction passage through which gas flows toward the compressor wheel and an exhaust passage through which gas flows away from the compressor wheel; a backflow pipe having inside thereof a backflow passage configured to return to the suction passage apart of the gas flowing to an exhaust port from the exhaust passage; a first opening (an exhaust opening) formed in a wall portion of the exhaust passage and connected to a first end portion (one end portion) of the backflow pipe; and a second opening (a suction opening) formed in a wall portion of the suction passage and connected to a second end portion (the other end portion) of the backflow pipe. In a state where the backflow pipe has been removed from the first opening and the second opening, the second opening is formed at a position at which the second opening is visible when seen from a position opposite to the first opening.

The housing may be positioned out of the way of a virtual line connecting centers of the first opening and the second opening.

The first end portion (the one end portion) and the second end portion (the other end portion) of the backflow pipe may be parallel to each other in a state where the backflow pipe has been connected to the first opening and the second opening.

The backflow pipe may be made of an elastic material.

According to the present disclosure, a turbocharger capable of suppressing the generation of flow noise caused by the compressed air when the compressed air is returned to the upstream side of the compressor wheel while reducing the complication of the design work.

DESCRIPTION OF THE EMBODIMENTS

Figure 1:
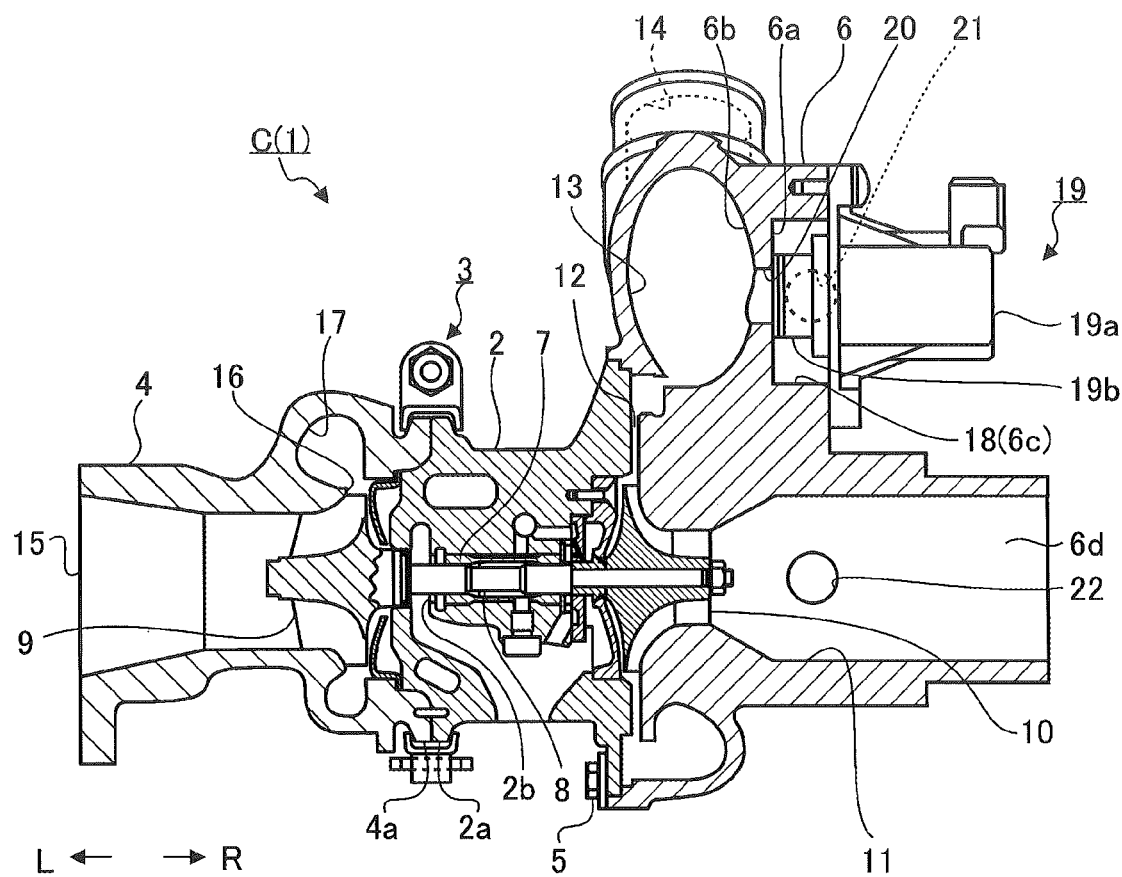
FIG. 1 is a schematic cross-sectional view of a turbocharger according to an embodiment of the present disclosure.

Exemplary embodiments of the present disclosure are explained in detail below with reference to the accompanying drawings. Dimensions, material, other specific numerical values, and the like mentioned in the below embodiments are merely examples that facilitate the understanding of the disclosure, and should not be used to limit the scope of the present disclosure. Furthermore, in the present specification and drawings, structural elements having substantially the same function and/or configuration are indicated by the same reference numerals and overlapping explanation thereof is omitted. Moreover, structural elements having no direct relation with the present disclosure have been omitted from the drawings.

FIG. 1 is a schematic cross-sectional view of a turbocharger C. In the following explanation, an arrow L shown in FIG. 1 depicts the left side of the turbocharger C and an arrow R depicts the right side of the turbocharger C. As shown in FIG. 1, the turbocharger C includes a turbocharger body 1. The turbocharger body 1 includes a bearing housing 2, a turbine housing 4 connected to the left edge of the bearing housing 2 with a fastening mechanism 3, and a compressor housing (housing) 6 connected to the right edge of the bearing housing 2 with a fastening bolt 5. All these structural elements can be integrated to form a single piece.

A protrusion 2a is arranged on the outer circumferential surface of the bearing housing 2 near the edge thereof to which the turbine housing 4 is connected. The protrusion 2a protrudes in a radial direction of the bearing housing 2. Moreover, a protrusion 4a is arranged on the outer circumferential surface of the turbine housing 4 near the edge thereof to which the bearing housing 2 is connected. The protrusion 4a protrudes in a radial direction of the turbine housing 4. The bearing housing 2 and the turbine housing 4 are secured together with the fastening mechanism 3 by a band fastening method. The fastening mechanism 3 is constituted by a fastening band (such as a G coupling) that holds the protrusions 2a and 4a together.

A bearing hole 2b is formed in the bearing housing 2. The bearing hole 2b extends in the left-right direction in the turbocharger C, and passes through the bearing housing 2 from the left edge to the right edge thereof. A bearing 7 is arranged inside the bearing hole 2b. The bearing 7 rotatably supports a shaft 8 (a rotation axis). A turbine wheel 9 is integrally fixed to one end of the shaft 8. The turbine wheel 9 is rotatably accommodated inside the turbine housing 4. A compressor wheel 10 is integrally fixed to the other end of the shaft 8. The compressor wheel 10 is rotatably accommodated inside the compressor housing 6.

A suction passage 11 is formed in the compressor housing 6. The suction passage 11 opens on the right side of the turbocharger C and is connected to an air cleaner (not-shown). Gas (for example, air) is sucked in the turbocharger C by the rotation of the compressor wheel 10, and the sucked gas flows through the suction passage 11 from outside of the compressor housing 6 toward the front surface of the compressor wheel 10.

In a state where the bearing housing 2 and the compressor housing 6 are connected to each other with the fastening bolt 5, surfaces of both the housings 2 and 6 that are facing each other form a diffuser passage 12 that is operative to increase the pressure of the gas. The diffuser passage 12 is formed in a circular manner from the inner side to the outer side in a radial direction of the shaft 8. The diffuser passage 12 communicates with the suction passage 11 via the compressor wheel 10 in the inner side in the radial direction.

A compressor scroll passage 13 is formed in the compressor housing 6. The compressor scroll passage 13 is positioned on the outer side than the diffuser passage 12 in the radial direction of the shaft 8 and is formed in a circular manner. The compressor scroll passage 13 communicates with a suction port (not-shown) of an engine, and also communicates with the diffuser passage 12. Accordingly, when the compressor wheel 10 rotates, the gas gets sucked into the suction passage 11 from outside of the compressor housing 6. When the gas is circulated between wings of the compressor wheel 10, the pressure and the speed of the sucked gas are increased, and the pressure of the gas is further increased in the diffuser passage 12 and the compressor scroll passage 13.

The gas compressed by the compressor wheel 10 is then guided to the outside the compressor housing 6 from the compressor scroll passage 13 via an exhaust port 14, and is discharged into the suction port (not-shown) of the engine connected to the exhaust port 14.

A discharge port 15 is formed in the turbine housing 4. The discharge port 15 opens on the left side of the turbocharger C and is connected to an exhaust gas purifying device (not-shown). Moreover, a flow passage 16 and a turbine scroll passage 17 are formed in the turbine housing 4. The turbine scroll passage 17 is positioned on the outer side than the flow passage 16 in the radial direction of the shaft 8 and is formed in a circular manner. The turbine scroll passage 17 communicates with a gas inlet (not-shown) to which the exhaust gas from an exhaust manifold of the engine is guided. The turbine scroll passage 17 also communicates with the flow passage 16. Accordingly, the exhaust gas guided from the gas inlet to the turbine scroll passage 17 is guided toward the discharge port 15 via the flow passage 16 and the turbine wheel 9, and rotates the turbine wheel 9 during such a circulation thereof. The rotation force of the turbine wheel 9 is transmitted to the compressor wheel 10 via the shaft 8, and the pressure of the gas is increased and the gas is guided toward the suction port of the engine by the rotation force of the compressor wheel 10.

In a vehicle in which the turbocharger C is installed, when a throttle valve of an engine is closed by releasing the accelerator and the like, the turbo pressure increases and the suction flow rate reduces. As a result, a surge occurs, thereby generating noise. To address this issue, a mechanism that returns a part of the gas after compression to the upstream side is typically provided in the compressor housing 6.

As shown in FIG. 1, a hole 18 is formed on the right side of the turbocharger body 1 (the compressor housing 6). A right-side opening of the hole 18 is blocked and thus closed by a body 19a of an air bypass valve 19. Moreover, a passage 20 is arranged between the hole 18 and the compressor scroll passage 13. In other words, in the compressor housing 6, a wall surface 6b of the compressor housing 6 includes a substantially cylindrical (substantially tubular) wall portion 6e on which the air bypass valve 19 (the body 19a) is mounted. The hole 18 is formed in the wall portion 6e. The hole 18 extends in the driving direction of a valve body 19b of the air bypass valve 19. Wall surfaces 6a and 6c of the compressor housing 6 respectively form a bottom surface and a side surface of the hole 18. A diameter of the hole 18 is set to a value that ensures the operation of the valve body 19b.

The passage 20 is arranged between the wall surface 6a of the compressor housing 6, which forms the bottom surface of the hole 18, and the compressor scroll passage 13. The passage 20 extends from the wall surface 6a till the wall surface 6b of the compressor housing 6 that forms the compressor scroll passage 13. In other words, the hole 18 of the compressor housing 6 communicates with the compressor scroll passage 13 via the passage 20. The gas whose pressure is increased by the compressor wheel 10 is guided to an exhaust passage formed by the compressor scroll passage 13, the passage 20, and the hole 18.

The valve body 19b of the air bypass valve 19 is arranged in the wall surface 6a of the compressor housing 6 such that a sheet surface positioned in the peripheral vicinity of the passage 20 can contact the valve body 19b. An electric actuator of the air bypass valve 19, for example, closes the passage 20 by causing the valve body 19b to come in contact with the sheet surface or opens the passage 20 by separating the valve body 19b from the sheet surface. The electric actuator is operated based on a control signal from the engine.

The air bypass valve 19 explained above is driven by an electric actuator; however, the air bypass valve 19 can be a mechanical valve that opens or closes when a diaphragm is operated by the action of a difference in pressures in the compressor scroll passage 13 and the suction passage 11.

A through hole 21 is formed in the wall surface 6c (the wall portion 6e) of the compressor housing 6 that forms the side surface of the hole 18. The exhaust passage (the hole 18) communicates to the outside of the compressor housing 6 through the through hole 21. Moreover, a through hole 22 is formed in a wall surface 6d of the compressor housing 6 that forms the suction passage 11. The suction passage 11 communicates to the outside of the compressor housing 6 through the through hole 22. A backflow pipe 23 shown in FIG. 2A is connected to the through holes 21 and 22 from the outside of the compressor housing 6.

Figure 2A:
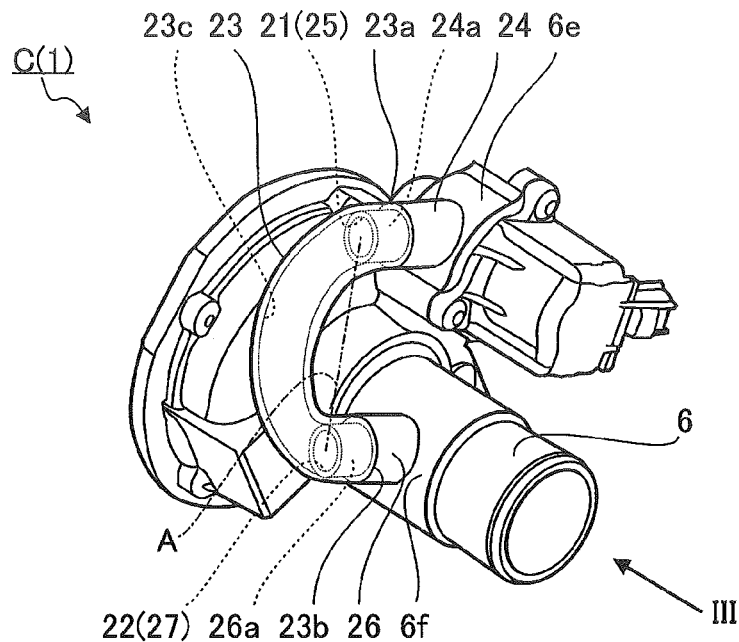
FIGS. 2A and 2B are views explaining a connecting structure of a backflow pipe and through holes according to the present embodiment.
Figure 2B:
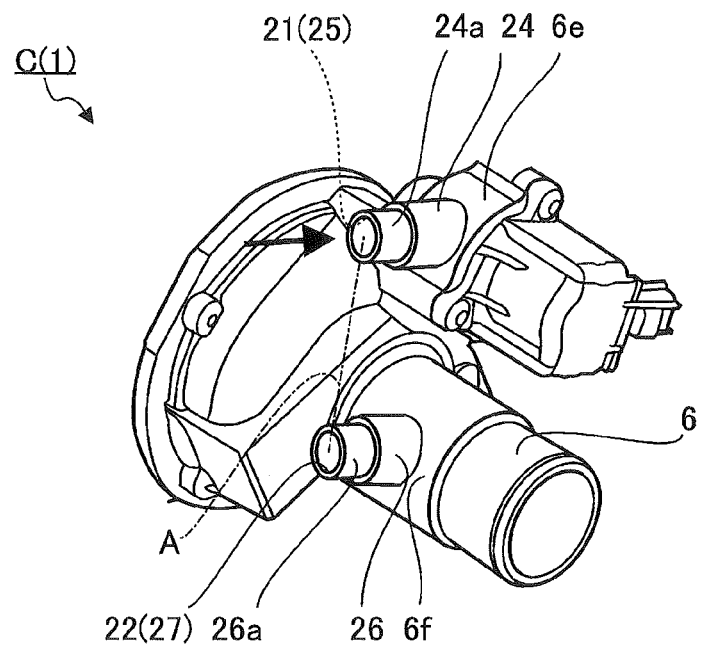

FIGS. 2A and 2B are views explaining a connecting structure of the backflow pipe 23 and the through holes 21 and 22. FIG. 2A is an external view of the turbocharger C, and FIG. 2B is an external view of the turbocharger C from which the backflow pipe 23 has been removed.

As shown in FIG. 2B, a protrusion 24 is arranged on the wall portion 6e of the compressor housing 6. The protrusion 24 is cylindrical (tubular) in shape, and protrudes from the wall portion 6e in an axial direction of the through hole 21. The through hole 21 passes through the radial center of the protrusion 24 whereby a tip end of the protrusion 24 communicates to the outside of the compressor housing 6.

An exhaust opening (a first opening) 25 is an opening of the through hole 21 positioned at the tip end of the protrusion 24. The exhaust opening 25 is formed in the wall portion 6e of the compressor housing 6, and causes the exhaust passage to communicate to the outside of the compressor housing 6.

A wall portion 6f of the compressor housing 6 includes the suction passage 11 inside thereof. A protrusion 26 is arranged in the wall portion 6f. The protrusion 26 is cylindrical (tubular) in shape, and protrudes from the wall portion 6f in an axial direction of the through hole 22. The through hole 22 passes through the radial center of the protrusion 26 whereby a tip end of the protrusion 26 communicates to the outside of the compressor housing 6.

A suction opening (a second opening) 27 is an opening of the through hole 22 positioned at the tip end of the protrusion 26. The suction opening 27 is formed in the wall portion 6f of the suction passage 11 inside the compressor housing 6 (refer to FIG. 1), and causes the suction passage 11 to communicate to the outside of the compressor housing 6.

As shown in FIG. 2A, the backflow pipe 23 is fitted to the compressor housing 6. A small diameter part 24a is formed at the tip end of the protrusion 24. The small diameter part 24a has a smaller outer diameter than that of a base end of the protrusion 24. Similarly, a small diameter part 26a is formed at the tip end of the protrusion 26. The small diameter part 26a has a smaller outer diameter than that of a base end of the protrusion 26. The small diameter part 24a of the protrusion 24 is inserted onto one end (a first end) 23a of the backflow pipe 23, and the small diameter part 26a of the protrusion 26 is inserted onto the other end (a second end) 23b of the backflow pipe 23. The backflow pipe 23 is made of an elastic material such as rubber. A fastening band (not-shown) is arranged on an outer periphery of each of the one end 23a and the other end 23b of the backflow pipe 23. Accordingly, the backflow pipe 23 is fitted to the protrusions 24 and 26.

In other words, the one end 23a of the backflow pipe 23 is connected to the exhaust opening 25, and the other end 23b of the backflow pipe 23 is connected to the suction opening 27. The backflow pipe 23 includes a backflow passage 23c inside thereof. The backflow passage 23c returns to the suction passage 11 a part of the gas flowing from the exhaust passage toward the exhaust port 14 (refer to FIG. 1).

For example, when the turbo pressure increases and the flow rate reduces excessively, by opening the air bypass valve 19, a part of the compressed gas is returned to the suction passage 11 positioned upstream of the compressor wheel 10 via the backflow passage 23c. Accordingly, because the flow rate of the gas toward the compressor wheel 10 increases, occurrence of surge can be avoided.

As explained above, because the backflow passage 23c is located outside the turbocharger body 1, the degree of freedom concerning the shape of the backflow passage 23c can be improved. For example, it is possible to increase the flow passage area of the backflow passage 23c, and when done so, the suction opening 27 can be arranged at a position away from the compressor wheel 10 but on the upstream side of the compressor wheel 10. Accordingly, compared to a configuration in which the suction opening 27 is arranged inside the turbocharger body 1, interference with the mainstream flowing in the suction passage 11 is reduced, and the flow noise can be suppressed.

In a state where the backflow pipe 23 has been removed from the exhaust opening 25 and the suction opening 27, the exhaust opening 25 and the suction opening 27 are in a positional relationship in which the suction opening 27 is visible when seen from a position opposite to the exhaust opening 25. For example, as shown in FIG. 2B, in a state where the backflow pipe 23 has been removed from the exhaust opening 25 and the suction opening 27, the exhaust opening 25 and the suction opening 27 are in a positional relationship in which the suction opening 27 is visible when seen from a position facing the exhaust opening 25 (in other words, when the exhaust opening 25 is seen from a direction indicated by an arrow in FIG. 2B). In other words, in a state where the backflow pipe 23 has been removed from the exhaust opening 25 and the suction opening 27, the suction opening 27 is arranged at a position at which the suction opening 27 is visible when seen from a position opposite to (facing) the exhaust opening 25. Accordingly, fitting of the backflow pipe 23 onto the small diameter parts 24a and 26a becomes easy.

The compressor housing 6 is positioned out of the way of a virtual line A that connects the centers of the exhaust opening 25 and the suction opening 27. In other words, the compressor housing 6 is not positioned on a straight line between the exhaust opening 25 and the suction opening 27.

Therefore, when fitting the backflow pipe 23 onto the small diameter parts 24a and 26a, the effort of arranging the backflow pipe 23 while avoiding the compressor housing 6 is saved, resulting in improved workability.

Figure 3:
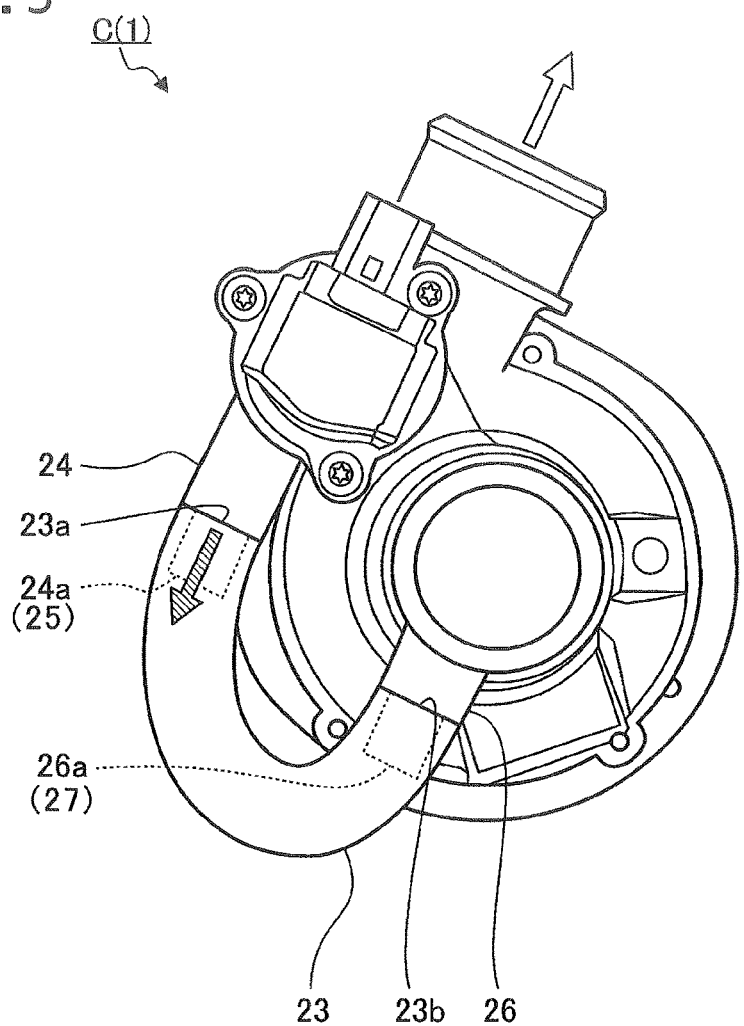
FIG. 3 is a view of the turbocharger when seen from a direction indicated by an arrow III shown in FIG. 2A.

FIG. 3 is a view of the turbocharger C when seen from a direction indicated by an arrow III shown in FIG. 2A. As shown in FIG. 3, in a state where the backflow pipe 23 is connected to the exhaust opening 25 and the suction opening 27, the one end 23a side and the other end 23b side of the backflow pipe 23 are parallel to each other. In other words, protruding directions of the protrusions 24 and 26 are parallel to each other, and the small diameter parts 24a and 26a extend parallel to each other in the same direction.

Therefore, because of the structure of the one end 23a and the other end 23b of the backflow pipe 23, the insertion directions of the small diameter parts 24a and 26a in the backflow pipe 23 when the backflow pipe 23 is fitted on the small diameter parts 24a and 26a remain the same, resulting in improved workability compared to a configuration in which such insertion directions are different.

As shown in FIG. 3, a flow direction (indicated by a hatched arrow in FIG. 3) of the gas flowing toward the exhaust opening 25 is opposite to a flow direction of the gas flowing toward the exhaust port 14 (indicated by a hollow arrow in FIG. 3) from the exhaust passage (the compressor scroll passage 13 shown in FIG. 1). In other words, after branching off from the compressor scroll passage 13 toward the hole 18 side via the passage 20, the gas flowing toward the exhaust opening 25 flows in the opposite direction of the gas flowing from the exhaust passage toward the exhaust port 14.

Figure 4:
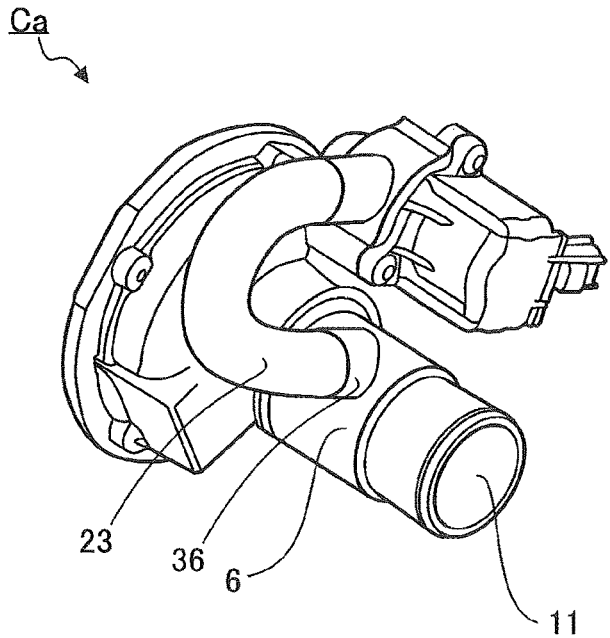
FIG. 4 is an external view of a turbocharger according to a modification of the present embodiment.

FIG. 4 is an external view of a turbocharger Ca according to a modification. In the embodiments explained above (refer to FIG. 2A), the protrusion 26 protrudes outwardly in a radial direction of the compressor wheel 10 in the suction passage 11. In other words, the rotation axis of the compressor wheel 10 falls on an axis of the through hole 22 in the protrusion 26.

On the other hand, as shown in FIG. 4, a protrusion 36 in the modification is offset from the rotation axis of the compressor wheel 10. An axis of a through hole (not-shown) formed in the protrusion 36 is offset so that the rotation axis of the compressor wheel 10 does not fall on the axis of the through hole in the protrusion 36.

The compressed gas flowing from the backflow passage 23c in the suction passage 11 flows along the rotation direction of the compressor wheel 10 inside the suction passage 11. Therefore, interference of the gas from the backflow passage 23c with the mainstream flowing in the suction passage 11 is reduced, and the flow noise can be suppressed.

According to the embodiments and modification explained above, the compressor housing 6 is positioned out of the way of the virtual line A that connects the centers of the exhaust opening 25 and the suction opening 27. However, a part of the compressor housing 6 can be positioned on the virtual line A that connects the centers of the exhaust opening 25 and the suction opening 27.

According to the embodiments and modification explained above, in a state where the backflow pipe 23 has been connected to the exhaust opening 25 and the suction opening 27, the one end 23a and the other end 23b of the backflow pipe 23 are parallel to each other. However, it is allowable that the one end 23a and the other end 23b of the backflow pipe 23 are not parallel to each other, but make an angle with each other.

According to the embodiments and modification explained above, as shown in FIG. 3, the backflow passage is provided on the side having the exhaust opening 25 toward which the gas flows and which is the side opposite to the direction in which the gas flows through the exhaust passage toward the exhaust port 14. However, it is not necessary to always arrange the backflow passage on the side having the exhaust opening 25 toward which the gas flows and which is the side opposite to the direction in which the gas flows through the exhaust passage toward the exhaust port 14.

Moreover, according to the embodiments and modification explained above, the backflow pipe 23 is made of an elastic material such as rubber. The material of the backflow pipe 23, however, is not limited to the elastic material. The backflow pipe 23 made of the elastic material is advantageous as it absorbs the energy generated by the gas flowing through the backflow passage 23c upon collision in the backflow pipe 23 thereby reducing the flow noise.

Moreover, according to the modification explained above, the protrusion 36 and the through hole (not-shown) formed therein are offset from the rotation axis. However, it is allowable that the protrusion 36 is not offset, and only the through hole is offset. In other words, the through hole can be inclined with respect to a direction on which the rotation axis falls so as to be extended along the direction of rotation of the compressor wheel 10.

Exemplary embodiments of the present disclosure are explained above. The present disclosure, however, is not limited to the above embodiments. In the category specified in the scope of the claims, it is obvious for a person skilled in the art to arrive at various modifications or revisions, and it should be understood by the person skilled in the art that such modifications or revisions fall within the technical scope of the present disclosure.

What is claimed is:

1. A turbocharger comprising:
   a housing configured to accommodate a compressor wheel, including:
      a suction passage formed in the housing, the suction passage including a suction port;
      an exhaust passage formed in the housing, the exhaust passage communicated with the suction passage via the compressor wheel and including an exhaust port;
      a sub passage branched from between the compressor wheel and the exhaust port in the exhaust passage, having an opening configured for a valve to be mounted to open and close the sub passage;
      a first tube communicated to the sub passage, including a first opening formed at a tip end of the first tube to be opened toward an outside of the housing; and
      a second tube communicated to the suction passage, branched from between the suction port and the compressor wheel in the suction passage, and including a second opening formed at a tip end of the second tube to be opened toward the outside of the housing; and
   a backflow pipe including a first end portion detachably connected to the first tube and a second end portion detachably connected to the second tube, configured to fluidly connect between the first tube and the second tube, wherein
   the second tube protrudes from a wall of the suction passage substantially in a same direction in which the first tube protrudes from a wall of the sub passage toward the first opening, and
   the second opening is visibly provided from a position where the first opening is seen from an outside of the first opening in a state where the backflow pipe has been removed from the first opening and the second opening.

2. The turbocharger according to claim 1, wherein the housing is positioned out of the way of a virtual line connecting centers of the first opening and the second opening.

3. The turbocharger according to claim 1, wherein the first end portion and the second end portion of the backflow pipe are parallel to each other in a state where the backflow pipe has been connected to the first tube and the second tube.

4. The turbocharger according to claim 2, wherein the first end portion and the second end portion of the backflow pipe are parallel to each other in a state where the backflow pipe has been connected to the first tube and the second tube.

5. The turbocharger according to claim 1, wherein the backflow pipe is made of an elastic material.

6. The turbocharger according to claim 2, wherein the backflow pipe is made of an elastic material.

7. The turbocharger according to claim 3, wherein the backflow pipe is made of an elastic material.

8. The turbocharger according to claim 4, wherein the backflow pipe is made of an elastic material.

9. The turbocharger according to claim 1, wherein the tip end of the first tube has an outer diameter smaller than that of a base end of the first tube.

10. The turbocharger according to claim 1, wherein the tip end of the second tube has an outer diameter smaller than that of a base end of the second tube.

\* \* \* \* \*